United States Patent Office 3,553,258
Patented Jan. 5, 1971

3,553,258
PHENYLALANINE COMPOUNDS
Ado Kaiser, Neu-Frenkendorf, and Albert Langemann, Binningen, Switzerland, assignors to Hoffmann-La Roche Inc., Nutley, N.J., a corporation of New Jersey
No Drawing. Filed May 24, 1967, Ser. No. 640,842
Claims priority, application Switzerland, June 7, 1966, 8,245/66
Int. Cl. C07c 101/08
U.S. Cl. 260—519          7 Claims

ABSTRACT OF THE DISCLOSURE

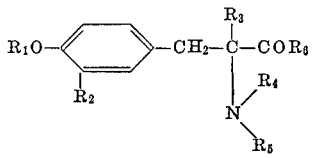

wherein $R_1$ is either hydrogen, lower alkyl or lower alkanoyl; $R_2$ is either lower alkyl, lower alkenyl, lower cycloalkyl, lower cycloalkenyl, phenyl or phenyl-lower alkyl; $R_3$ is lower alkyl; $R_4$ is either hydrogen or lower alkanoyl; $R_5$ is either hydrogen or lower alkanoyl; and $R_6$ is either hydroxy, lower alkoxy, amino or lower alkanoylamino; and pharmaceutically acceptable acid addition salts thereof, useful for inhibiting the sympathetic nervous system and inhibiting tyrosine-hydroxylase; processes for their production from the appropriate hydantoin, nitrile, nitro compound or isocyanate and resolution of the racemates of the compounds.

SUMMARY OF THE INVENTION

This invention relates to a novel class of compounds displaying pharmaceutical utility and processes for their preparation. More particularly, this invention relates to novel racemic and optically active phenylalanine derivatives of the formula

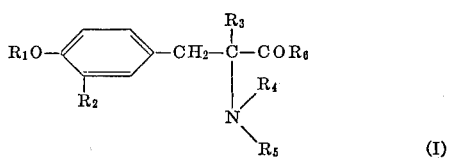

wherein $R_1$ is selected from the group consisting of hydrogen, lower alkyl, and lower alkanoyl; $R_2$ is selected from the group consisting of lower alkyl, lower alkenyl, lower cycloalkyl, lower cycloalkenyl, phenyl and phenyl-lower alkyl; $R_3$ is lower alkyl; $R_4$ is selected from the group consisting of hydrogen and lower alkanoyl; $R_5$ is selected from the group consisting of hydrogen and lower alkanoyl; and $R_6$ is selected from the group consisting of hydroxy, lower alkoxy, amino and lower alkanoylamino; and pharmaceutically acceptable acid addition salts thereof.

As used herein in Formula I and throughout the specification lower alkyl includes alkyl groups containing from 1 to 7 carbon atoms inclusive, e.g., methyl, ethyl, isopropyl, tertiary butyl; lower alkanoyl includes alkanoyl groups containing up to and including 7 carbon atoms, e.g., acetyl, isobutyryl; lower alkenyl includes alkenyl groups containing up to and including 7 carbon atoms, e.g., allyl; lower cycloalkyl includes cycloalkyl groups containing up to and including 7 carbon atoms, e.g., cyclopropyl, cyclobutyl, cyclohexyl; lower cycloalkenyl includes cycloalkenyl groups containing up to and including 7 carbon atoms, e.g., cyclohexen-(1)-yl; phenyl-lower alkyl includes phenylalkyl groups containing from 1 to 7 carbon atoms in the alkylene chain, e.g., benzyl, phenethyl; lower alkoxy includes alkoxy groups containing up to and including 7 carbon atoms, e.g., methoxy, ethoxy, isopropoxy; lower alkanoylamino includes alkanoylamino groups containing up to and including 7 carbon atoms, e.g., acetylamino, propionylamino.

DETAILED DESCRIPTION OF THE INVENTION

Compounds represented by Formula I, as well as the acid addition salts thereof possess valuable pharmaceutical properties, for example, they can be used to inhibit the sympathetic nervous system, to inhibit tyrosine-hydroxylase, and act as hypotensives, e.g., as shown by tests in cats and rats.

These compounds can be employed as medicaments, for example, in the form of pharmaceutical preparations. They can be administered orally, or by injection, e.g., in capsule form or intravenous injection. Dosages can be from about 2 mg./kg. to about 2000 mg./kg. animal body weight applied enterally or parenterally, e.g., orally or by injection, with the dosage adjusted to speces and individual requirements.

The compounds of Formula I, that is, both the bases and acid addition salts thereof, can be used as such or in the form of conventional pharmaceutical preparations. For example, they can be administered in conventional enteral or parenteral pharmaceutical excipients containing organic and/or inorganic inert carriers such as water, gelatin, gum arabic, lactose, starch, magnesium stearate, talc, vegetable oil, polyalkylene glycols, Vaseline, or the like. The pharmaceutical preparations can be provided in solid form such as tablets, dragees, suppositories, capsules and the like or in conventional liquid forms, for example, suspensions, solutions and emulsions. If desired, they can be sterilized and/or mixed with conventional pharmaceutical adjuvants such as preservatives, stabilizing agents, wetting agents, emulsifying agents, buffers or salts used for the adjustment of osmotic pressure. If desired, they can also be used in admixture with other therapeutically valuable substances.

The compounds of Formula I are particularly advantageous as inhibitors of tyrosine-hydroxylase and display hypotensive activity.

A subgenus of compounds within this invention which are particularly advantageous in this respect are those of the formula

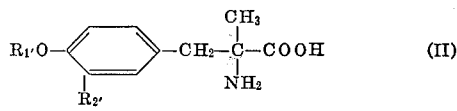

wherein $R_1'$ is selected from the group consisting of hydrogen and lower alkyl, and $R_2'$ is selected from the group consisting of lower alkyl, phenyl, phenyl-lower alkyl and lower cycloalkyl, and pharmaceutically acceptable acid addition salts thereof.

Representative compounds within the scope of this preferred embodiment of the invention are DL-α-methyl-β-(4-hydroxy-3-methyl-phenyl)-alanine
DL-α-methyl-β-(4-hydroxy-3-phenyl-phenyl)-alanine
DL-α-methyl-β-(4-hydroxy-3-benzyl-phenyl)-alanine
DL-α-methyl-β-(4-methoxy-3-cyclohexyl-phenyl)-alanine
DL-α-methyl-β-(4-hydroxy-3-cyclohexyl-phenyl)-alanine and their pharmaceutically acceptable acid addition salts. Of the above compounds the one which displays most interesting properties is DL-α-methyl-β-(4-hydroxy-3-methyl-phenyl)-alanine and its acid addition salts.

The compounds of Formula I can be prepared by alternative methods depending upon the starting materials, for example, a hydantoin can be hydrolytically cleaved according to the following reaction scheme A, which is the preferred method of this invention.

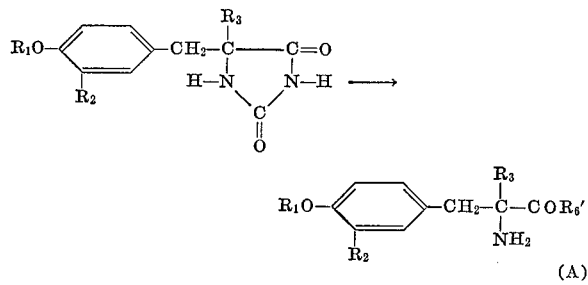

(A)

wherein $R_1$, $R_2$ and $R_3$ have the same significance as in Formula I and $R_6'$ is hydroxy or amino.

Alternatively, a nitrile can be saponified according to the following reaction scheme B

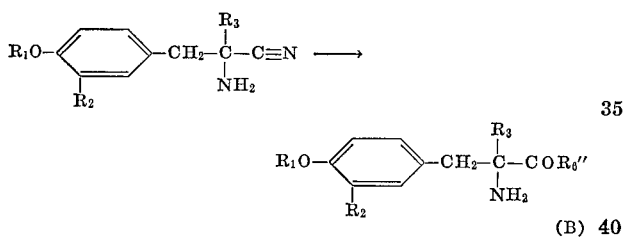

(B)

wherein $R_1$, $R_2$ and $R_3$ have the same significance as in Formula I and $R_6''$ is hydroxy, lower alkoxy or amino.

A further alternative process for producing the compounds of Formula I is wherein a nitro compound is reduced according to the following reaction scheme C

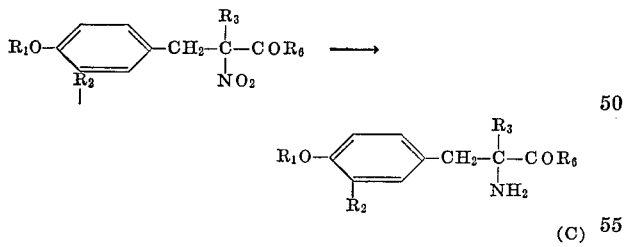

(C)

wherein $R_1$, $R_2$, $R_3$ and $R_6$ have the same significance as in Formula I.

A final alternative process for producing the compounds of Formula I is wherein an isocyanate is hydrolyzed according to the following reaction scheme D

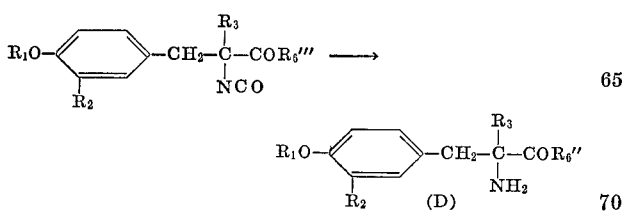

(D)

wherein $R_1$, $R_2$ and $R_3$ have the same significance as in Formula I and $R_6'''$ is hydroxy or lower alkoxy.

The various reaction products of the depicted reaction schemes can be further reacted to provide desired substituents, particularly at $R_4$, $R_5$, $R_6$, $R_6'$, $R_6''$ and $R_6'''$, however, $R_1$ may also be modified. Thus, it can be seen that certain of the compounds within the scope of Formula I can be intermediates as well as pharmacologically active compounds. For example, ether groups can be cleaved, free hydroxyl groups can be esterified, free amino groups can be acylated, the carbalkoxy group can be saponified and the carboxyl group can be esterified or amidated. Furthermore, the products produced as a result of the above reactions can be converted into acid addition salts.

The compounds of this invention are produced as racemic mixtures, however, it is contemplated by this invention that these racemates be resolved into their optical isomers by formation of esters with optically active acids or in the form of salts with optically active bases.

The hydantoin of the formula

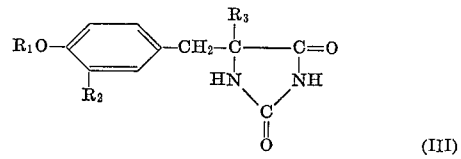

(III)

wherein $R_1$, $R_2$ and $R_3$ have the same significance as in Formula I, used to prepare the compounds of Formula I according to reaction scheme A can be produced by condensation of an aldehyde of the formula

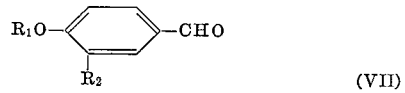

(VII)

with a nitroalkane of the formula $R_3$—$CH_2$—$NO_2$ in an excess of the nitroalkane, toluene, or benzene at elevated temperatures, preferably reflux temperatures, in the presence of an ammonium salt catalyst, i.e., ammonium acetate, monomethyl ammonium acetate, monobutyl ammonium acetate or diethyl ammonium acetate. The resulting nitro compound of the formula

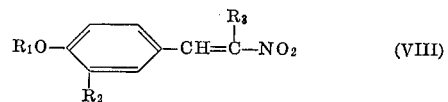

(VIII)

is then reduced with nascent hydrogen to a ketone of the formula

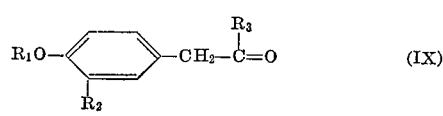

(IX)

This reduction is advantageously carried out at elevated temperatures, preferably reflux temperatures, with iron in aqueous acidic medium, e.g., aqueous acetic acid.

The ketone of Formula IX is then converted to the hydantoin of Formula III by reaction with a mixture of an alkali cyanide and ammonium carbonate in an aqueous lower alkanol, e.g., methanol, at slightly elevated temperatures. The preferred reaction mixture is composed of ammonium carbonate and potassium cyanide.

The hydantoin is recovered by distilling off the lower alkanol under reduced pressure and is purified by recrystallization from aqueous methanol.

The nitrile of the formula

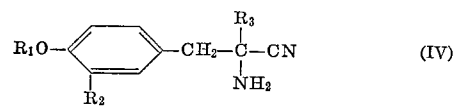

(IV)

wherein $R_1$, $R_2$ and $R_3$ have the same significance as in Formula I, used to prepare the compounds of Formula I, is made from the ketone of Formula IX by reaction with an alkali cyanide and ammonia or an ammonium salt. This reaction is carried out in a solvent, e.g., water, a lower alkanol or an aqueous lower alkanol at room temperature or at a slightly elevated temperature.

The nitro compound of the formula

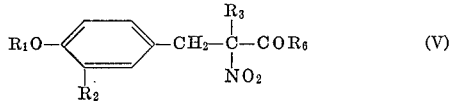

wherein $R_1$, $R_2$, $R_3$ and $R_6$ have the same significance as in Formula I, used to prepare the compounds of Formula I, can be produced by reaction of an alkali salt of an α-nitro carboxylic acid ester of the formula

in which $R_3$ has the same significance as in Formula I, and $R_6''''$ signifies lower alkoxy or benzyloxy, with a compound of the formula

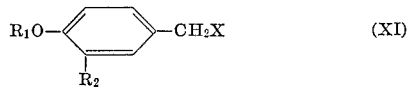

in which X represents chlorine, bromine, iodine, lower alkyl-sulphonyloxy, phenyl-sulphonyloxy, lower alkyl-phenyl-sulphonyloxy or lower dialkylamino and $R_1$ and $R_2$ have the significance given above, in a lower alkanol, dimethyl sulfoxide or dimethylformamide at room temperature or slightly elevated temperatures. The product of this reaction is an ester of Formula V; this ester can be saponified to the carboxylic acid with dilute alkali. The resulting acid can subsequently be amidated with a suitable amine and a dehydrating agent, as for example, dicyclohexyl carbodiimide or carbonyl-bis-imidazole, in a non-polar solvent such as dimethylformamide or a mixture of methylene chloride/dioxane at room temperature or slightly elevated temperatures.

The isocyanate of the formula

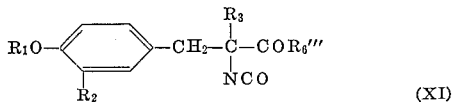

wherein $R_1$, $R_2$ and $R_3$ have the same significance as in Formula I and $R_6'''$ is hydroxy or lower alkoxy, which is employed to produce the compound of Formula I, is obtained by reaction of a compound of Formula XI with an alkali salt of a compound of the formula

wherein $R_3$ has the same significance as in Formula I and $R_6''''$ is lower alkoxy or benzyloxy, and subsequent saponification with a molar amount of alkali hydroxide to result in a half-ester of the formula

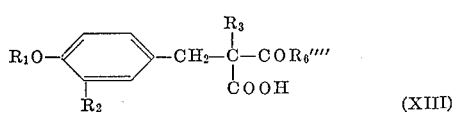

The carboxyl group of this half-ester can be converted into a carbonyl halide group and then be converted into the isocyanate group by reaction with sodium azide forming the α-isocyanato esters of Formula VI. In order to convert the half-ester of Formula XIII into the α-isocyanato carboxylic acid of Formula VI the alkoxycarbonyl can be treated with ammonia to form the carbamoyl group, or treated with hydrazine to form the hydrazino carbonyl group. The resulting products are subsequently degraded to the isocyanate by the Hofmann reaction, e.g., treatment with an alkali-hypohalite such as sodium hypobromite or chlorite or by the Curtius reaction, e.g., treatment with nitrous acid and heating of the resulting azide.

The preceding processes are exemplary of the known methods available for producing the starting materials used in the process of this invention.

The preparative processes which utilize the hydantoins of Formula III as a starting material to produce the compounds of Formula I are preferred. These hydantoins may be hydrolytically cleaved, for example, by treatment with strongly basic agents to result in products whose etherified hydroxyl groups are retained. Suitable basic agents are, for example, aqueous barium hydroxide solution or aqueous alkali hydroxide solution. The cleavage can be brought about by heating the hydantoins at temperatures above 150° C. at elevated pressure, or for a longer time at boiling under reflux conditions at normal pressure with concentrated aqueous alkali hydroxide solutions, e.g., a sodium, potassium or barium hydroxide solution. In order to achieve complete cleavage of the hydantoin ring, the basic agent is employed in considerable excess. The hydrolytic treatment leads to a mixture consisting of the free acid and the amide thereof from which both components can be isolated. The difficulty soluble free acid can be separated off after concentration of the reaction mixture. The more readily soluble amide is obtained from the mother liquor.

The hydantoins can also be hydrolytically opened with simultaneous ether cleavage, by treatment with strong acids, such as hydrohalic acids, e.g., constant-boiling, 48% hydrobromic acid.

The saponification of the nitrile of Formula IV to the corresponding amide is effected in the presence of aqueous mineral acids such as hydrochloric acid, sulphuric acid or phosphoric acid at low temperature, about 0–20° C. The corresponding carboxylic acid is formed if the reaction temperature is from about 80° C. to the boiling point of the reaction mixture. The corresponding ester of Formula I results when the saponification is effected in the presence of a suitable alcohol and a strong mineral acid, an organic sulphonic acid or a Lewis acid such as sulphuric acid, p-toluenesulphonic acid or boron trifluoride etc. at a temperature between about room temperature and the boiling point of the reaction mixture. By means of this reaction, the imido ether is formed and is converted to the ester.

The nitro compounds of Formula V can be converted into the corresponding amino compounds by reduction. This reduction can be effected by hydrogenation in the presence of a hydrogenation catalyst such as Raney-nickel or palladium, or by treatment with reducing agents, e.g., zinc and acid or amalgamated aluminum.

The hydrolysis of the isocyanate group of a compound of Formula VI to an amino group is effected by treatment with either a mineral acid, e.g., nitric acid or an aqueous alkali such as caustic soda or potash, conveniently at elevated temperatures.

Etherified hydroxyl groups present in the reaction products, e.g., alkoxy groups, can be converted into hydroxyl groups by heating with hydrohalic acids, e.g., 48% hydrobromic acid. Subsequent esterification of the hydroxyl groups can be effected by treatment with an acid halide, e.g., an acid chloride, or an acid anhydride, perferably in the presence of a tertiary base, e.g., pyridine.

The introduction of N-alkanoyl groups into the reaction products can be effected, for example, by treatment with an alkanoylating agent such as a carboxylic acid halide or anhydride in the presence of a basic agent, e.g., pyridine, or an alkali, e.g., caustic soda or potash.

Carbalkoxy groups which are present in the reaction products can be saponified by treatment with an aqueous alkali, and free carboxyl groups can be esterified or amidated by conventional means, e.g., esterification with a lower aliphatic alcohol is effected in the presence of an acidic catalyst, e.g., gaseous hydrogen chloride, p-toluenesulphonic acid, sulphinyl chloride or thionyl chloride.

The compounds of the present invention are formed as racemates, by the processes described herein and in one aspect of this invention, the racemic phenylalanine compounds of this invention can be separated into the optcially active isomers after isolation from the reaction mixture in which the racemates are formed. For example, they can be isolated in the form of an ester with an optically active acid such as tartaric acid, or, the acylamino derivatives can be resolved in the form of their salts with optically active bases, e.g., with quinine or brucine. The starting materials can be similarly resolved with the result that the pure optical isomers of Formula I are directly obtained in the described reactions in accordance with this invention.

Compounds of Formula I form acid addition salts both with inorganic and with organic acids; for example, with hydrochloric acid or hydrobromic acid, sulphuric acid, oxalic acid, citric acid etc.

The phenylalanine derivatives obtainable in accordance with this invention are colorless to pale grayish colored compounds. They are generally soluble in water. As a consequence of their amphoteric character, they also dissolve readily in acids and alkalis. Their purification from inorganic impurities can be done over weakly basic and weakly acidic ion exchangers.

The compounds of this invention are prepared in accordance with the following illustrative examples in which temperatures are in ° C.

EXAMPLE 1

(a) β-Methyl-β-nitro-4-methoxy-3-methyl-styrene

A mixture of 55.5 g. of 4-methoxy-3-methyl-benzaldehyde, 23.2 g. of ammonium acetate and 480 ml. of nitromethane is heated under reflux conditions in a nitrogen atmosphere for 8 hours, subsequently cooled and concentrated under reduced pressure. The residue is partitioned between 1000 ml. of methylene chloride and 500 ml. of water. The aqueous phase is separated and discarded. The methylene chloride phase is successively shaken out with 500 ml. of 2 N aqueous sulphuric acid, 500 ml. of water, 500 ml. of saturated aqueous sodium bicarbonate solution and 500 ml. of water, subsequently dried over sodium sulphate and evaporated under reduced pressure. The residual deep yellow colored oil is chromatographed on Kieselgel (Merck, grain size 0.2–0.5 mm.). The light yellow colored oil isolated by elution with a mixture of 1:1 benzene/petroleum ether crystallized out on digestion with petroleum ether. The β-methyl-β-nitro-4-methoxy-3-methyl-styrene obtained melts at 33–37° after recrystallization from ether/petroleum ether.

(b) Methyl-(4-methoxy-3-methyl-benzyl)-ketone 64.6 g. of β-methyl-β-nitro-4-methoxy-3-methyl-styrene are added portionwise with stirring in the course of 8 hours to a boiling mixture of 93.5 g. of iron powder, 376 ml. of water, 518 ml. of methanol and 28.3 ml. of glacial acetic. The mixture is thereafter further stirred under reflux conditions for 16 hours and subsequently cooled. 465 ml. of 2 N aqueous hydrochloric acid and, subsequently, 139 ml. of concentrated aqueous hydrochloric acid are then added. The resulting dark brown solution is extracted three times with 1 liter of benzene. The benzene extracts are washed twice with 500 ml. of 2 N aqueous hydrochloric acid, once with 1000 ml. of water and twice with 500 ml. of saturated aqueous sodium bicarbonate solution, then combined, dried over sodium sulphate (with addition of animal charcoal), filtered off and concentrated under reduced pressure. The residual crude oil is distilled. Methyl-(4-methoxy-3-methyl-benzyl)-ketone is obtained as a pale yellow colored oil which boils at 143–145°/11 mm.; $n_D^{25}=1.5258$.

(c) 5-Methyl-5-(4-methoxy-3-methyl-benzyl)-hydantoin 41 g. of methyl-(4-methoxy-3-methyl-benzyl)-ketone, 30 g. of potassium cyanide and 221 g. of ammonium carbonate in a mixture of 300 ml. of water and 300 ml. of methanol are stirred for 15 hours at 50° and subsequently for 1 hour at 60–65°. The reaction mixture is concentrated to about 500 ml. under reduced pressure and cooled. The crystals which separate out are filtered off by suction and recrystallized from methanol. There are obtained colorless crystals of 5-methyl-5-(4-methoxy-3-methyl-benzyl)-hydantoin which melts at 203–205°.

(d) DL-α-methyl-β-(4-hydroxy-3-methyl-phenyl) alanine 15 g. of 5-methyl-5-(4-methoxy-3-methyl-benzyl)-hydantoin are boiled under reflux with 200 ml. of 48% aqueous hydrobromic acid for 24 hours. The brown colored solution is completely evaporated under reduced pressure. The residue is taken up in 50 ml. of water. The solution is treated with active charcoal and subsequently filtered. The filtrate is adjusted to pH 5 with 2-N aqueous ammonia solution. The precipitated crystals are recrystallized three times from water. The crystalline DL-α-methyl-β-(4-hydroxy-3-methyl-phenyl)-alanine obtained is a colorless compound which melts at 325° with decomposition.

EXAMPLE 2

The procedures of Example 1(a) through (d) are followed except 3-phenyl compounds are used in place of the 3-methyl compounds. Thus, the resulting products are as follows:

(a) β-methyl-β-nitro-4-methoxy-3-phenyl-styrene
(b) Methyl-(4-methoxy-3-phenyl-benzyl)-ketone
(c) 5-methyl-5-(4-methoxy-3-phenyl-benzyl)-hydantoin and
(d) DL-α-methyl-β-(4-hydroxy-3-phenyl-phenyl)alanine, which is recovered in the form of colorless crystals which melt at 279–281°, with decomposition.

EXAMPLE 3

DL-α-methyl-β-(4-methoxy-3-benzyl-phenyl)-alanine 20 g. of 5-methyl-5-(4-methoxy-3-benzyl-benzyl)-hydantoin are dissolved in 400 ml. of 4 N aqueous caustic soda and heated under reflux conditions for 53 hours. The solution is cooled and adjusted to pH 5 with aqueous hydrochloric acid. The precipitate which separates out is filtered, dissolved in 200 ml. of boiling 2 N aqueous hydrochloric acid, treated with active charcoal and filtered hot. The resulting crude, crystalline DL-α-methyl-β-(4-methoxy-3-benzyl-phenyl)-alanine separates out on cooling of the filtrate and is recrystallized twice from 0.2 N aqueous hydrochloric acid. The resulting product has a melting point of 207–213° (dec.).

EXAMPLE 4

DL-α-methyl-β-(4-hydroxy-3-benzyl-phenyl)-alanine

The product obtained in Example 3 is heated under reflux for 3 hours in 150 ml. of 48% aqueous hydrobromic acid. The solution is then cooled. The crystals which thereby separate out are dissolved in 100 ml. of boiling water with the addition of a few drops of hydrobromic acid, treated with activated charcoal, and filtered hot. The filtrate is adjusted to pH 5 with 2 N aqueous ammonia solution. The crystals which thereby separate out are filtered off, washed with water and dried. The resulting product is DL-α-methyl-β-(4-hydroxy-3-benzyl-phenyl)-alanine which melts at 285–292°, with decomposition.

EXAMPLE 5

DL-α-methyl-β-(4-methoxy-3-cyclohexyl-phenyl)-alanine

A solution of 5-methyl-5-(4-methoxy-3-cyclohexyl-benzyl)-hydantoin in 200 ml. of 4 N aqueous caustic soda is heated under reflux conditions for 53 hours. The reaction mixture is cooled and adjusted to pH 5 with aqueous hydrochloric acid. The resulting crystals which thereby separate out are filtered off and washed with water. The product is then dissolved in boiling 2 N hydrochloric acid, treated with activated charcoal, and filtered hot. The filtrate is cooled. The resulting crystals are recrystallized twice from 1 N aqueous hydrochloric acid. The product is then dissolved in boiling water with the addition of a little dilute hydrochloric acid. The hot solution is brought to pH 5 with 2 N aqueous ammonia and cooled. The resulting crystals are washed with water and acetonitrile and dried. The resulting product obtained is DL-α-methyl-β-(4-methoxy-3-cyclohexyl-phenyl)-alanine with melts at 273–275°, with decomposition.

EXAMPLE 6

DL-α-methyl-β-(4-hydroxy-3-cyclohexyl-phenyl)-alanine 4 g. of DL-α-methyl-β-(4-methoxy-3-cyclohexyl-phenyl)-alanine are heated under reflux conditions for 4 hours in 40 ml. of constant boiling aqueous 48% hydrobromic acid. The resulting solution is then evaporated to dryness under reduced pressure. The resulting residue is dissolved in 50 ml. of water, treated with activated charcoal and filtered. The filtrate is then adjusted to pH 5 with 2 N aqueous ammonia solution. The product which separates out is filtered off, washed with water and dried under reduced pressure. There is recovered colorless crystals of DL-α-methyl-β-(4-hydroxy-3-cyclohexyl-phenyl)alanine which melt at 280–285°, with decomposition.

EXAMPLE 7

(a) α-methyl-α-amino-β-(4-methoxy-3-methyl-phenyl)-propionitrile

A mixture of 17 grams of methyl-(4-methoxy-3-methyl-benzyl)-ketone, 6.5 grams of potassium cyanide, 5.3 grams of ammonium chloride and 60 ml. of water are stirred for 18 hours at 55–60° and subsequently extracted twice with about 200 ml. of ether each time. The ether extract is extracted twice each time with 200 ml. of water and twice each time with 100 ml. of 3 N aqueous hydrochloric acid. The combined hydrochloric acid extract is evaporated under reduced pressure. The residue of hydrochloride of DL - α - methyl-α-amino-β-(4-methoxy-3-methyl-phenyl)-propionitrile, thus obtained, can, without further purification, be used for the preparation of DL-α-methyl-β-(4-hydroxy-3-methyl-phenyl)-alanine.

(b) DL-α-methyl-β-(4-hydroxy-3-methyl-phenyl)-alanine 8.5 grams of DL-α-methyl-α-amino-β-(4-methoxy-3-methyl-phenyl)-propionitrile-hydrochloride are heated 24 hours under reflux conditions in 200 ml. of concentrated hydrochloric acid. The residue is dissolved in 200 ml. of constant boiling hydrobromic acid, heated 2 hours under reflux conditions and subsequently evaporated under reduced pressure. The brown residue is taken up in 100 ml. of water. The solution is agitated with active charcoal, filtered and evaporated. The fresh residue is dissolved in 100 ml. of water. The pH of the solution at boiling is adjusted to a pH of 4 to 5 by the addition of a saturated sodium bicarbonate solution and cooled. The resulting crystals of DL-α-methyl-β-(4-hydroxy-3-methyl-phenyl)-alanine are successively washed with water, ethanol and ether and dried in a vacuum at 50°. The compound melts at 325°.

EXAMPLE 8

(a) DL-α-methyl-α-nitro-β-(4-methoxy-3-methyl-phenyl)-ethyl propionate 29.4 grams of α-nitro ethyl propionate are introduced into a suspension of 4.8 grams of sodium hydride in 50 ml. of absolute dimethylformamide and 50 ml. of absolute dimethylsulfoxide and mixed for 2 hours at room temperature. After completion of the hydrogen evolution the clear solution is heated under agitation with a mixture of 34 grams of 4-methoxy-3-methyl-benzyl chloride and 50 ml. of absolute dimethylsulfoxide, the stirring is continued for 24 hours without further warming or cooling and then the solution is heated with stirring for 3 hours to maintain the temperature at 75°. The reaction mixture is then cooled, diluted with 300 ml. of water and extracted twice, each time with 500 ml. of benzene/ether, (1:1). The extract is successively washed with water, 2 N hydrochloric acid, water, an aqueous sodium bicarbonate solution and fresh water, combined, dried over sodium sulfate, filtered and evaporated under reduced pressure. The resulting oily residue which consists essentially of DL-α-methyl-α-nitro-β-(4-methoxy-3-methylphenyl)-ethyl propionate, ethyl pyruvate-oxime and 4-methoxy-3-methyl-benzaldehyde is absorbed on Kieselgel (grain size 0.4–0.5 mm.). The yellow oily DL-α-methyl-α - nitro-β-(4-methoxy-3-methyl-phenyl)-ethyl propionate recovered, could, without further purification, be used to prepare DL-α-methyl-β-(4-methoxy-3-methyl-phenyl)-alanine.

(b) DL-α-methyl-β-(4-methoxy-3-methyl-phenyl)-alanine 15 grams of DL-α-methyl-α-nitro-β-(4-methoxy-3-methyl-phenyl)-ethyl propionate are dissolved in 150 ml. absolute ethanol and 15 ml. of glacial acetic acid and hydrogenated under normal condition using as a catalyst 1.5 grams of palladium on charcoal (5%). The hydrogenation is stopped after about 18 hours, after 2,240 ml. of hydrogen are taken up. The catalyst is filtered off. The filtrate is further hydrogenated after the addition of 1.5 grams of fresh palladium on charcoal, until 1350 ml. of hydrogen is taken up. Subsequently, the solution is separated from the catalyst and is evaporated under reduced pressure. The residue is taken up in 500 ml. of ether and extracted twice, each time with 120 ml. 2 N aqueous hydrochloric acid. The hydrochloric acid extract is evaporated under reduced pressure. The residue is dissolved in 200 ml. of 2 N aqueous hydrochloric acid, heated 12 hours under reflux conditions, then cooled and evaporated under reduced pressure. The residue is taken up in 100 ml. of water. The solution is mixed with decolorizing charcoal, filtered and the pH is adjusted to pH 5 by the addition of aqueous sodium bicarbonate. The precipitated crystals of DL-α-methyl-β-(4-methoxy-3-methylphenyl)-alanine are successively washed with water, ethanol and ether and are dried under a vacuum at 50°. The resulting compound melts at 270° with decomposition.

EXAMPLE 9

(a) Methyl-(4-methoxy-3-methyl-benzyl)-diethyl malonate 10.5 grams of diethyl methylmalonate are dissolved in 180 ml. of absolute dimethylformamide and the solution is added with stirring within 10 minutes into a suspension of 14.1 grams of sodium hydride in 120 ml. of absolute dimethylformamide. The temperature of the reaction mixture should not exceed 70°. The reaction mixture is stirred 30 minutes at 50°. The clear solution is then cooled at room temperature, added with stirring, to 100 grams of 4-methoxy-3-methyl-benzylchloride in 300 ml. of absolute dimethylformamide and after the exothermic reaction stopped, it is further stirred for 1 hour at 70°. The reaction mixture is thereupon cooled, concentrated to 300 ml. under reduced pressure, and partitioned between 1000 ml. of benzene and 500 ml. of water. The aqueous phase is separated and discarded. The benzene solution is washed successively with water, 2 N aqueous hydrochloric acid, water, saturated aqueous sodium bicarbonate and with water, dried over sodium sulphate and evaporated under reduced pressure. The remaining oily methyl-(4-methoxy-3-methyl-benzyl)-diethyl malonate boils at 128–131°/ 0.02 mm. Hg.

(b) DL-methyl-(4-methoxy-3-methyl-benzyl)-malonic acid monoethyl 100 grams of methyl-(4-methoxy-3-methyl-benzyl)-diethyl malonate is added to a solution of 16 grams potassium hydroxide in 300 ml. of ethanol. The reaction mixture, after standing 20 hours at room temperature, is acidified with 2 N aqueous sulfuric acid while cooling with ice, and twice extracted, each time with 500 ml. of ether. The ether extract is washed with water and extracted with 2 N aqueous sodium carbonate solution. The starting material can be recovered unaltered from the ether phase. The sodium carbonate extract is collected, acidified with 2 N aqueous sulfuric acid and twice extracted, each time with 500 ml. of ether. The ether extract is washed 4 times, each time with 200 ml. of water, collected, dried over sodium sulfate, and evaporated under reduced pressure. The recovered product is crude DL-methyl-(4-methoxy-3-methyl-benzyl)-malonic acid monoethylester.

(c) DL-methyl-(4-methoxy-3-methyl-benzyl)-malonic acid ether ester chloride 48 grams of DL-methyl-(4-methoxy-3-methyl-benzyl)-malonic acid monoethylester is added to 250 ml. of thionylchloride, heated under reflux conditions for 3 hours and then dried under reduced pressure. The residue is taken up by 200 ml. of toluene. The toluene is distilled off. The process is repeated until the thionylchloride radical is completely removed. After that, the reaction mixture is distilled under nitrogen gas to give DL-methyl-(4-methoxy-3-methyl-benzyl)-malonic acid ethyl ester chloride, a yellow oil which boils at 172–173°/1.5 mm. Hg.

(d) DL-methyl-(4-methoxy-3-methyl-benzyl)-malonic acid ethyl ester azide 41.5 grams of DL-methyl-(4-methoxy-3-methyl-benzyl)-malonic acid ethyl ester chloride in 350 ml. of acetone is added with stirring and cooling with ice into a solution of 9.5 grams of sodium azide in 26 ml. of acetone. The temperature of the solution should not go over 12°. The reaction mixture, after the addition of 400 ml. of water, is extracted twice, each time with 400 ml. of ether. The ether extract is washed twice, each time with 200 ml. of water, combined, dried over sodium sulfate and evaporated under reduced pressure. Crude DL-methyl-(4-methoxy-3-methyl-benzyl)-malonic acid ethyl ester azide, a colorless oil, is recovered.

(e) DL-α-isocyanato-α-methyl-β-(4-methoxy-3-methyl-phenyl)-ethyl propionate 41 grams of crude DL-methyl-(4-methoxy-3-methyl-benzyl)-malonic acid ethyl ester azide is dissolved in 500 ml. of absolute toluene and heated slowly. The reaction at 80° C., caused the azide portion to be removed and ended after 10 minutes of heating at the reflux temperature. The resulting deep yellow solution is cooled and evaporated under reduced pressure. The remaining crude DL-α-isocyanato-α-methyl - β - (4 - methoxy - 3 - methyl-phenyl)ethyl propionate can, without purification, be used as the starting material for the preparation of DL-α-methyl-β-(4-methoxy-3-methyl-phenyl)-alanine.

(f) DL-α-methyl-β-(4-methoxy-3-methyl-phenyl)-alanine 34.5 grams of DL-α-isocyanato-α-methyl-β-(4-methoxy-3-methyl-phenyl)-ethyl propionate are dissolved in 500 ml., 3 N aqueous hydrochloric acid, heated 16 hours under reflux conditions then cooled and extracted twice, each time with 300 ml. of ethyl acetate. The aqueous solution is evaporated under reduced pressure. The residual crude DL - α - methyl - β - ,(4 - methoxy-3-methyl-phenyl)-alanine hydrochloride is dissolved in 50 ml. of water. The solution is filtered and adjusted to pH 5 with the addition of saturated aqueous sodium bicarbonate solution. The precipitated crystals of DL-α-methyl-β-(4-methoxy-3-methyl-phenyl)-alanine are washed successively with water, ethanol and ether and dried under a vacuum at 50°. The compound melts at 270° with decomposition.

(g) DL-α-methyl-β-(4-hydroxy-3-methyl-phenyl)-alanine 18 grams of DL-α-methyl-β-(4-methoxy-3-methyl-phenyl)-alanine are added to 200 ml. of constant boiling hydrobromic acid and heated 3 hours under reflux conditions. The brown solution is cooled and evaporated under reduced pressure. The residue is dissolved in 100 ml. of water. The solution is agitated with decolorizing charcoal, filtered and evaporated under reduced pressure. The newly formed residue is dissolved in 100 of water. The solution is adjusted to pH 5 by the addition of a saturated aqueous solution of sodium bicarbonate. The precipitated crystals of DL-α-methyl-β-(4-hydroxy-3-methyl-phenyl) - alanine are successively washed with water, ethanol, and ether and dried in a vacuum at 50°. The compound melts at 325° C. with decomposition.

EXAMPLE 10

(a) Potassium salt of DL-methyl-(4-methoxy-3-methyl-benzyl)-malonic acid monoethylester A mixture of 100 grams of methyl-(4-methoxy-3-methylbenzyl)-diethyl malonate and 30 ml. of absolute ethanol are introduced into a solution of 18.2 grams of potassium hydroxide in 150 ml. of absolute ethanol. The reaction mixture remains for 36 hours at room temperature and is subsequently cooled to −25° for 24 hours more. The resulting precipitated crystalline potassium salt of DL-methyl-(4-methoxy-3-methyl-benzyl)-malonic acid monoethylester is washed in ethanol/ether (1:1), and ether and dried in a vacuum at 60°.

(b) Potassium salt of DL-methyl-(4-methoxy-3-methyl-benzyl)-malonic acid monohydrazide 56 grams of the potassium salt of DL-methyl-(4-methoxy-3-methyl-benzyl)-malonic acid monoethylester and 7 grams of anhydrous hydrazine are dissolved in 70 ml. of ethanol and heated under reflux conditions for 4 hours. The reaction mixture is cooled and evaporated under reduced pressure. The resulting crystalline potassium salt of DL-methyl-(4-methoxy-3-methyl-benzyl)-malonic acid monohydrazide melts, after 72 hours of drying in a vacuum over sulfuric acid, at 175–178° with decomposition.

(c) DL-methyl-(4-methoxy-3-methyl-benzyl)-malonic acid monoazide 53 grams of the potassium salt of DL-methyl-(4-methoxy-3-methyl-benzyl)-malonic acid monohydrazide is dissolved in 425 ml. of water, combined with a solution of 12.25 grams of sodium nitrite in 100 ml. of water and covered with a layer of 425 ml. of ether. During one hour, 34.8 grams of concentrated aqueous hydrochloric acid in 106 ml. of water is dropped into this mixture at 15–20° with brisk stirring. The aqueous phase is separated and twice extracted, each time with 200 ml. of ether. The ether phase is collected, washed with 200 ml. of water, dried over sodium sulfate, mixed with 200 ml. of benzene, and evaporated under reduced pressure in a temperature bath of 25° C. The resulting oily product is DL-methyl-(4-methoxy-3-methyl-benzyl)-malonic acid monoazide.

(d) DL-α-isocyanato-α-methyl-β-(4-methoxy-3-methyl-phenyl)-propionic acid 53.7 grams of DL-methyl-(4-methoxy-3-methyl-benzyl)-malonic acid monazide in 425 ml. of absolute toluene is heated for 10 minutes under reflux conditions. After the nitrogen evolution ceases, the resulting deep yellow solution is evaporated under reduced pressure. The resulting compound, DL-α-isocyanato-α-methyl-β-(4-methoxy- 3-methyl-phenyl)-propionic acid is recovered without further purification.

(e) DL-α-methyl-β-(4-hydroxy-3-methyl-phenyl)-alanine 45 grams of crude DL-α-isocyanato-α-methyl-β-(4-methoxy-3-methyl-phenyl)-propionic acid is introduced into 400 ml. of constant boiling aqueous hydrobromic acid and heated 5 hours under reflux conditions. The dark brown colored solution is evaporated under reduced pressure. The residue is dissolved in 100 ml. of water and extracted twice, each time with 300 ml. of ethylacetate. The combined extracts are evaporated under reduced pressure. The residue is redissolved in 100 ml. of water. The solution is agitated with decolorizing charcoal, filtered, and adjusted to pH 5 by the addition of saturated aqueous sodium bicarbonate. The crystalline precipitate, DL-α-methyl-β-(4-hydroxy-3-methyl - phenyl) - alanine was washed successively with water, ethanol, and ether and dried at 50° in a vacuum. The resulting compound melts at 325° with decomposition.

EXAMPLE 11

DL-α-methyl-β-(4-hydroxy-3-methyl-phenyl)-alanine methyl ester hydrochloride 24.5 grams of DL-α-methyl-β-(4-hydroxy-3-methyl-phenyl)-alanine are suspended in 200 ml. of absolute methanol and saturated at 0° with anhydrous hydrogen chloride gas. This causes the amino acid to go slowly in solution. The solution is heated at 50° during mild application of hydrogen chloride gas, then cooled and dried under reduced pressure. The recovered crystalline DL-α-methyl-β-(4-hydroxy - 3 - methyl-phenyl)-alanine-methyl-ester-hydrochloride melts, after two crystallizations from methanol/ether, at 217–219°.

EXAMPLE 12

(a) N,O-dibenzyloxycarbonyl-DL-α-methyl-β-(4-hydroxy-3-methyl-phenyl)-alanine 20 grams of benzyl chloroformate is simultaneously added with 2 N aqueous caustic soda into a solution of 10 grams of DL-α-methyl-β-(4-hydroxy-3-methyl-phenyl)-alanine in 100 ml. 1 N aqueous caustic soda. The pH of the reaction mixture should be maintained between 8 and 9. The reaction mixture is stirred for 2 hours at room temperature, then acidified carefully with 6 N aqueous sulfuric acid and subsequently extracted twice, each time with 200 ml. of ethyl acetate. The extract is washed three times, each time with 200 ml. of water, collected, dried over sodium sulfate and evaporated under reduced pressure. The recovered N,O-dibenzyloxycarbonyl-DL-α-methyl-β-(4-hydroxy-3-methyl-phenyl)-alanine melts after three crystallizations from ether/petroleum ether at 132–134°.

(b) N,O-dibenzyloxycarbonyl-DL-α-methyl-β-(4-hydroxy-3-methyl-phenyl)-alanine-N-hydroxysuccinimide ester 13 grams of N,O-dibenzyloxycarbonyl-DL-α-methyl-β-(4-hydroxy-3-methyl-phenyl)-alanine are mixed, under anhydrous conditions for 40 minutes, with 6 grams of dicyclohexylcarbodiimide, 4 grams of N-hydroxy-succinimide and 140 ml. of methylene chloride. The resulting exothermic reaction causes the reaction mixture to reach a temperature of 35° C. The crystals which separated, dicyclohexylurea, are filtered at 0° and washed with 50 ml. of methylene chloride. The filtrate is combined with the wash liquid and dried under reduced pressure. The recovered product, N,O-dibenzyloxycarbonyl-DL-α-methyl-β-(4-hydroxy-3-methyl-phenyl) - alanine-N-hydroxysuccinimide ester, melts after two recrystallizations from methylene chloride/ether and decolorization with decolorizing charcoal, at 148–149°.

(c) N,O-dibenzyloxycarbonyl-DL-α-methyl-β-(4-hydroxy-3-methylphenyl)-alanine amide 9.1 grams of N,O-dibenzyloxycarbonyl-DL-α-methyl-β-(4-hydroxy-3-methyl-phenyl) - alanine - N - hydroxysuccinimide ester are dissolved in 50 ml. of tetrahydrofuran and mixed with 5 ml. of concentrated aqueous ammonia. The reaction mixture is stirred for 0.5 hour. A gas phase which forms over the precipitated crystals is separated. The crystals are washed with 50 ml. of absolute tetrahydrofuran. The recovered tetrahydrofuran solutions are filtered and died under reduced pressure. The recovered colorless N,O - dibenzyloxycarbonyl - DL-α-methyl-β-(4-hydroxy-3-methyl-phenyl)-alanine amide melts, after two recrystallizations from methanol/acetone at 166–168°.

(d) DL-α-methyl-β-(4-hydroxy-3-methyl-phenyl)-alanine amide 5.2 grams of N,O-dibenzyloxycarbonyl-DL-α-methyl-β-(4-hydroxy-3-methyl-phenyl)-alanine amide are suspended in 130 ml. of aboslute methanol and after the addition of 0.5 palladium-charcoal (5%) hydrogenated under standard conditions. The taking up of hydrogen ends after 75 minutes. The catalyst is separated from the clear solution and washed with 100 ml. of boiling methanol. The filtrate is combined with the wash liquid and evaporated under reduced pressure. The recovered colorless DL-α-methyl-β-(4-hydroxy-3-methyl - phenyl) - alanine amide melts, after the recrystallization from methanol/ether, at 201–202°.

EXAMPLE 13

(a) N,O-diacetyl-DL-α-methyl-β-(4-hydroxy-3-methyl-phenyl)-alanine 5.8 grams of DL-α-methyl-β-(4-hydroxy-3-methyl-phenyl)-alanine, 7 ml. of acetic acid anhydride and 20 ml. of pyridine are heated on a steam bath for two hours, resulting in a homogeneous mixture. The resulting reaction mixture is poured into 200 ml. of ice water and acidified with 6 N aqueous sulfuric acid. The resulting crystalline precipitate of colorless N,O-diacetyl-DL-α-methyl-β-(4-hydroxy-3-methyl-phenyl)-alanine melts, after two recrystallizations from acetone/ether, at 197–198°.

(b) acetyl-DL-α-methyl-β-(4-hydroxy-3-methyl-phenyl)-alanine 2.8 grams of N,O-diacetyl-DL-α-methyl-β-(4-hydroxy-3-methyl-phenyl)-alanine are dissolved in 10 ml. of 2 N caustic soda and allowed to stand at room temperature for 12 hours and thereafter acidified, while cooling with ice, with 6 N aqueous sulfuric acid. The crystalline colorless precipitate of N-acetyl-DL-α-methyl-β-(4-hydroxy-3-methyl-phenyl)-alanine melts, after two recrystallizations from water, at 209–211°.

EXAMPLE 14

Tablet formulation

| | G. |
|---|---|
| DL-α-methyl-β-(4-hydroxy-3-methyl-phenyl)-alanine | 100 |
| Lactose | 61 |
| Maize starch | 30 |
| Polyvinylpyrrolidone | 4 |
| Talcum | 5 |

Procedure

DL-α-methyl-β-(4-hydroxy-3-methyl-phenyl)-alanine is mixed with lactose and maize starch and granulated with a solution of polyvinylpyrrolidone in 40 ml. of dilute ethanol. The granulate is dried at 30° and, after the addition of talcum, is pressed to tablets. The resulting tablets are ready for administration into a suitable host, e.g., cats, and have the following specifications:

Weight—200 mg./tablet
Dosage—100 mg./tablet

EXAMPLE 15

To illustrate the therapeutic activity of the compounds of this invention as hypotensives, normal adult rats operated according to A. Grollmann: Proc. Soc. exp. Biol. (N.Y.) 57 102–104 (1944) and implanted with desoxycosterone acetate. The animals are thereafter fed 0.9% sodium chloride solution and lib. This treatment created a hypertension in the rats. The so-treated hypertensive rats are each given a peroral dose of gum arabic solutions containing 100 mg./kg. of DL-α-methyl-β-(4-hydroxy-3-methyl-phenyl)-alanine (A) and the blood pressure is measured 1 hour and 3 hours thereafter. The hypotensive response is indicated in Table I.

HYPOTENSIVE EFFECT OF DL-α-METHYL-β-(4-HYDROXY-3-METHYL-PHENYL)-ALANINE

| Test substance | Change of blood pressure after 1 hr., mm. Hg | Change blood pressure after 3 hrs., mm. Hg |
|---|---|---|
| A | −65 | −72 |
| Control (1 ml., 0.9% NaCl solution) | | +6 |

It is evident from Table I that the tested compound A shows substantial and long-lasting hypotensive activity. That the dose employed, 100 mg./kg., causes no disturbing side effects, is shown from the following test:

Normal, growing rats are given peroral doses of gum arabic solutions containing 2000 mg. of compound A per kg. and day during 8 weeks, the daily dose being given on the 5 working days of each week. Other rats (control) are given the same amount of gum arabic solution with no addition of compound A. At the end of the 8 week test period the treated rats are compared with the control rats. No appreciable differences can be detected. Particularly, general behaviour of the rats, general weight increase, kidney weight and microscopical appearance of the kidneys suffered no noticeable detriment due to 8 weeks' treatment with 2000 mg. of compound A per kg. and day.

In consequence, therefore, the single 100 mg. dose of compound A per day which is employed to cause the hypotensive effect displayed in Table I, is considerably below the dose required to cause disturbing side effects, and is therefore safe to use.

We claim:
1. Compounds of the formula

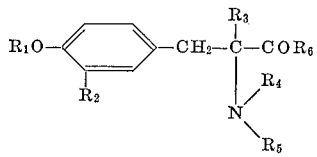

wherein $R_1$ is selected from the group consisting of hydrogen, lower alkyl, and lower alkanoyl; $R_2$ is selected from the group consisting of lower alkyl, lower alkenyl, lower cycloalkyl, lower cycloalkenyl, phenyl and phenyl-lower alkyl; $R_3$ is lower alkyl; $R_4$ is selected from the group consisting of hydrogen and lower alkanoyl; $R_5$ is selected from the group consisting of hydrogen and lower alkanoyl; and $R_6$ is selected from the group consisting of hydroxy, lower alkoxy, amino and lower alkanoylamino; and pharmaceutically acceptable acid addition salts thereof.

2. Compounds of the formula

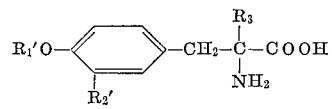

wherein $R'_1$ is selected from the group consisting of hydrogen and lower alkyl, $R'_2$ is selected from the group consisting of lower alkyl, phenyl, phenyl-lower alkyl and lower cycloalkyl, and $R_3$ is lower alkyl and pharmaceutically acceptable acid addition salts thereof.

3. DL - α - methyl - β - (4-hydroxy-3-methyl-phenyl)-alanine and pharmaceutically acceptable acid addition salts thereof.

4. DL - α-methyl - β - (4-hydroxy-3-phenyl-phenyl)-alanine and pharmaceutically acceptable acid addition salts thereof.

5. DL - α-methyl - β - (4-hydroxy-3-benzyl-phenyl)-alanine and pharmaceutically acceptable acid addition salts thereof.

6. DL - α - methyl - β - (4-methoxy-3-cyclohexyl-phenyl)-alanine and pharmaceutically accepetable acid addition salts thereof.

7. DL - α - methyl - β - (4-hydroxy-3-cyclohexyl-phenyl)-alanine and pharmaceutically acceptable acid addition salts thereof.

References Cited

UNITED STATES PATENTS

| | | | |
|---|---|---|---|
| 3,023,235 | 2/1962 | Leonard | 260—519 |
| 3,046,300 | 7/1962 | Sletzingen et al. | 260—471 |
| 3,329,711 | 7/1967 | Hegedus et al. | 260—519 |
| 3,366,679 | 1/1968 | Reinhold et al. | 260—519 |
| 3,454,629 | 7/1969 | Daeniker et al. | 260—519 |
| 3,470,233 | 9/1969 | Bohn et al. | 260—473 |

OTHER REFERENCES

Fiesen et al.: Organic Chemistry, 3rd ed. (1956), pub. by the Reinhold Corp. of New York, pp. 232–233, relied on.

LORRAINE A. WEINBERGER, Primary Examiner
L. A. THAXTON, Assistant Examiner

U.S. Cl. X.R.

260—309.5, 453, 456, 465, 471, 473, 478, 559, 590, 600, 612; 424—309, 319, 324